US012180042B2

(12) United States Patent
Minami et al.

(10) Patent No.: US 12,180,042 B2
(45) Date of Patent: Dec. 31, 2024

(54) CRANE CONTROL METHOD AND CRANE

(71) Applicant: TADANO LTD., Kagawa (JP)

(72) Inventors: Yoshimasa Minami, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 445 days.

(21) Appl. No.: 17/423,294

(22) PCT Filed: Mar. 27, 2020

(86) PCT No.: PCT/JP2020/013905

§ 371 (c)(1),
(2) Date: Jul. 15, 2021

(87) PCT Pub. No.: WO2020/196809

PCT Pub. Date: Oct. 1, 2020

(65) Prior Publication Data

US 2022/0081263 A1 Mar. 17, 2022

(30) Foreign Application Priority Data

Mar. 27, 2019 (JP) ................................ 2019-061193

(51) Int. Cl.
*B66C 13/48* (2006.01)
*B66C 23/00* (2006.01)
*B66C 23/42* (2006.01)

(52) U.S. Cl.
CPC .............. *B66C 13/48* (2013.01); *B66C 23/42* (2013.01); *B66C 23/54* (2013.01); *B66C 2700/0371* (2013.01)

(58) Field of Classification Search
CPC ......... B66C 13/48; B66C 23/42; B66C 23/54; B66C 2700/0371; B66C 13/063; B66C 13/46
See application file for complete search history.

(56) References Cited

U.S. PATENT DOCUMENTS

2009/0008351 A1* 1/2009 Schneider ............. B66C 13/085 212/278
2013/0245816 A1* 9/2013 Langer .................... B66C 13/02 700/228

(Continued)

FOREIGN PATENT DOCUMENTS

JP 2018-030692 A 3/2018

OTHER PUBLICATIONS

Nov. 23, 2022, European Search Report issued for related EP Application No. 20779855.4.

(Continued)

*Primary Examiner* — Ig T An
(74) *Attorney, Agent, or Firm* — Paratus Law Group, PLLC

(57) ABSTRACT

There is provided a crane control method whereby, during automatic transportation of a load along a preset transport route using a crane, it is possible to reliably transport the load along the route; and a crane that can be controlled by the crane control method. A control device (32) calculates target speed signals (VU), (VW), (VR) for designating the target hoisting speed and the target rotational speed of a boom (9) and the target winding/unwinding speed of main wire rope (14) or sub wire rope (16), calculates the maximum speeds (VUmax), (VWmax), (VRmax) of the hoisting and rotation of the boom (9) and winding/unwinding of the main wire rope (14) or the sub wire rope (16), and, if a target speed exceeds the corresponding maximum speed, controls the crane (1) by multiplying the target speed signal (VU), (VW), (VR) by a coefficient and restricting the target speed signal (VU), (VW), (VR) to be less than the corresponding maximum speed.

6 Claims, 7 Drawing Sheets

(56) References Cited

U.S. PATENT DOCUMENTS

| | | | | |
|---|---|---|---|---|
| 2014/0230785 A1* | 8/2014 | Kawaguchi | B60P 1/162 | 123/349 |
| 2019/0084809 A1* | 3/2019 | Claeys | B66C 23/90 | |

OTHER PUBLICATIONS

May 19, 2020, International Search Report issued for related PCT application No. PCT/JP2020/013905.
May 19, 2020, International Search Opinion issued for related PCT application No. PCT/JP2020/013905.

* cited by examiner

CRANE CONTROL METHOD AND CRANE

CROSS REFERENCE TO PRIOR APPLICATION

This application is a National Stage Patent Application of PCT International Patent Application No. PCT/JP2020/013905 (filed on Mar. 27, 2020) under 35 U.S.C. § 371, which claims priority to Japanese Patent Application No. 2019-061193 (filed on Mar. 27, 2019), which are all hereby incorporated by reference in their entirety.

TECHNICAL FIELD

The present invention relates to a crane control method and a crane that can be controlled by the control method.

BACKGROUND ART

Conventionally, for a crane, a technique of conveying a lifted load to a desired installation position along a set path through automated driving is known as disclosed in PTL 1, for example.

When a load is conveyed through automated driving using the crane disclosed in PTL 1, the lifting cargo can be conveyed along a desired path by operating together a plurality of actuators such as a slewing hydraulic motor, a luffing oil hydraulic actuator, and a winch hydraulic motor. However, in a known crane control method, the upper limit of the capacities of the actuators are not taken into consideration, and the upper limit of the capacity of some actuators may be exceeded during the control. Consequently, the lifting cargo may be deviated from the desired path, and the lifting cargo may sway.

CITATION LIST

Patent Literature

PTL 1
Japanese Patent Application Laid-Open No. 2018-030692

SUMMARY OF INVENTION

Technical Problem

An object of the present invention is to provide a crane control method that can reliably automatically convey a load along a set conveyance path using a crane, and a crane that can be controlled by the control method.

Solution to Problem

Problems to be solved by the present invention are as described above, and the solutions to solve the problems are described next.

A crane control method according to an embodiment of the present invention is a method of using a control apparatus to control a luffing operation of a boom, a slewing operation, and a feed-in operation and a feed-out operation of a wire rope, and to automatically convey a load along a conveyance path given as point group data including at least coordinates of a passing point of the load and a passage order of each passing point, the method including: by the control apparatus, setting a target conveyance time of the load in a section defined by two passing points adjacent to each other in the passage order; calculating a target conveyance speed of the load in the section from a distance between the two passing points and the target conveyance time; calculating, from the target conveyance speed, target speeds for requesting a luffing speed of the boom, a slewing speed and a feed-in and feed-out speed of the wire rope for achieving the target conveyance speed; calculating a maximum speed of each of the luffing speed of the boom, the slewing speed and the feed-in and feed-out speed of the wire rope in the section; limiting each of the target speeds to a value smaller than each of the maximum speeds by comparing each target speed and corresponding each maximum speed in the section, and multiplying each target speed by a coefficient of a value greater than 0 and smaller than 1 when there is a target speed that is greater than the corresponding maximum speed; and controlling the crane on a basis of each target speed that is limited.

In the crane control method according to an embodiment of the present invention, when one of the target speeds is greater than the corresponding maximum speed, the control apparatus calculates the coefficient by dividing, by the target speed, the maximum speed exceeded by the target speed.

In the crane control method according to an embodiment of the present invention, when a plurality of target speeds is greater than the corresponding maximum speed, the control apparatus sets, as the coefficient, a smallest value of values obtained by dividing, by the target speed, the maximum speed exceeded by the target speed.

In the crane control method according to an embodiment of the present invention, the control apparatus calculates each target speed that is limited before automatic conveyance of the load is started.

In the crane control method according to an embodiment of the present invention, the control apparatus calculates each target speed that is limited, for each section.

A crane according to an embodiment of the present invention includes a control apparatus configured to execute the crane control method.

Advantageous Effects of Invention

The present invention provides the following effects.

With the crane control method according to the embodiment of the present invention, it is possible to reliably automatically convey a load along a set conveyance path using a crane.

In addition, with the crane according to the embodiment of the present invention, it is possible to reliably automatically convey a load along a set conveyance path.

DESCRIPTION OF EMBODIMENTS

General Configuration of Crane

Figure 1:
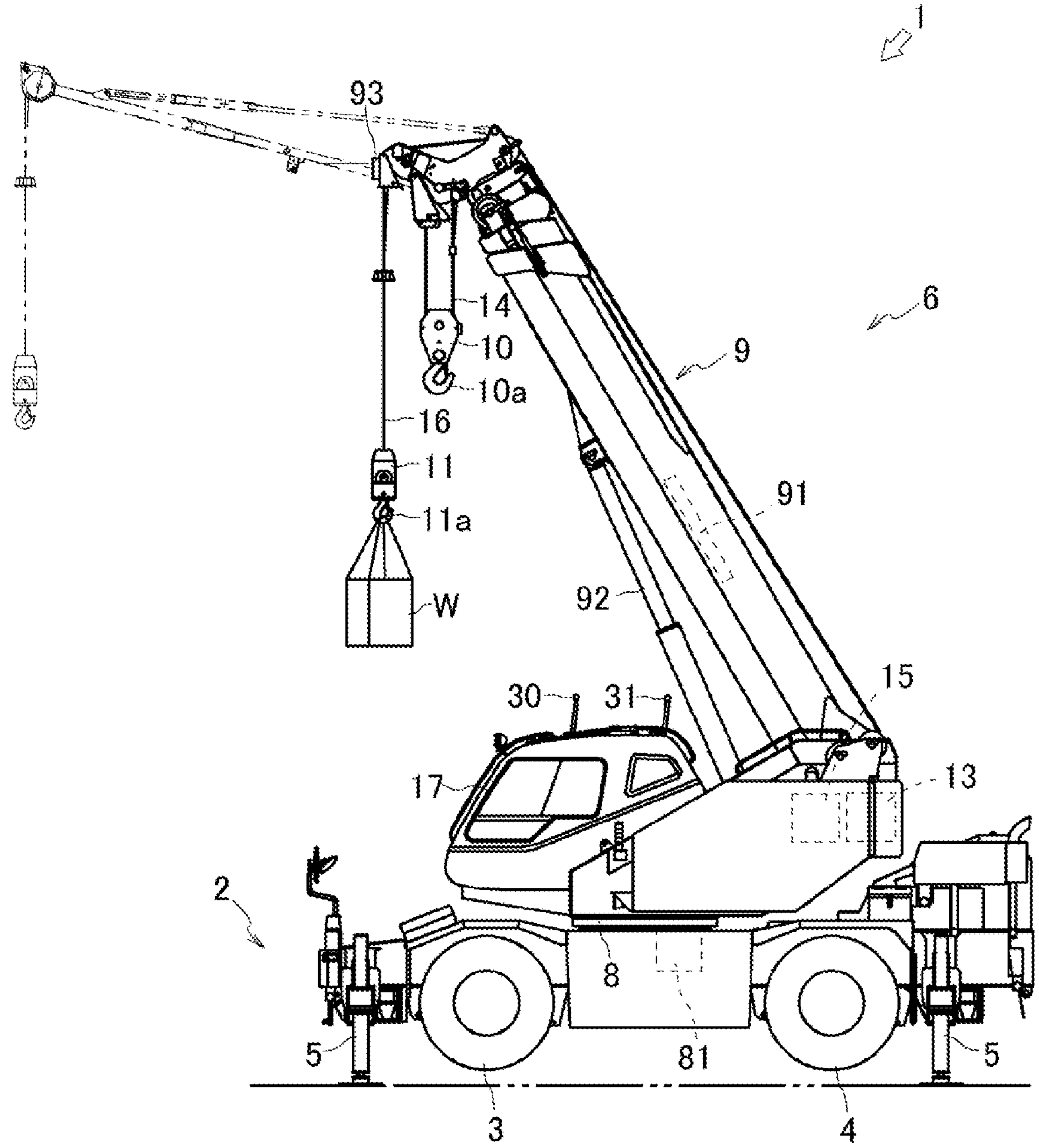
FIG. 1 is a side view illustrating a general configuration of a crane.

Crane 1 serving as a crane (rough terrane crane) according to an embodiment of the present invention is described below with reference to FIGS. 1 and 2. It is to be noted that a rough terrane crane is described as an example in the present embodiment, but the crane according to the embodiment of the present invention may be mobile cranes of other types such as all terrane cranes, truck cranes and loading truck cranes, and stationary cranes such as ceiling cranes.

Crane 1 is composed of vehicle 2 and crane apparatus 6.

Vehicle 2 includes pairs of left and right front wheels 3 and rear wheels 4. In addition, vehicle 2 includes outrigger 5 that is grounded for the purpose of stabilization when a task of conveying load W is performed. Note that vehicle 2 supports crane apparatus 6 on its top.

Crane apparatus 6 is an apparatus for lifting load W using a wire rope. Crane apparatus 6 includes slewing platform 8, boom 9, main hook block 10, sub hook block 11, main winch 13, main wire rope 14, sub winch 15, sub wire rope 16, cabin 17 and the like.

Slewing platform 8 is a structure configured to be capable of slewing crane apparatus 6. Slewing platform 8 is provided on a frame of vehicle 2 with an annular bearing therebetween. Slewing platform 8 is provided with slewing hydraulic motor 81 that is an actuator. Slewing platform 8 is configured to be slewed in the horizontal direction by slewing hydraulic motor 81.

Slewing hydraulic motor 81 is operated and rotated by slewing valve 22 that is an electromagnetic proportional switching valve. Slewing valve 22 can control, to any flow rate, the flow rate of the operation oil that is supplied to slewing hydraulic motor 81. That is, slewing platform 8 is configured to be controllable at any slewing speed through slewing hydraulic motor 81 rotated and operated by slewing valve 22. Slewing platform 8 is provided with slewing sensor 27 that detects the slewing angle and slewing speed of slewing platform 8.

Boom 9 is a structure configured to be capable of lifting load W. The base end of boom 9 is provided in a swayable manner at an approximate center of slewing platform 8. Boom 9 is provided with luffing hydraulic cylinder 92 and telescoping hydraulic cylinder 91, as an actuator. Boom 9 is configured to be extendable in the longitudinal direction with telescoping hydraulic cylinder 91. In addition, boom 9 is configured to be capable of luffing in the vertical direction with luffing hydraulic cylinder 92. Further, boom 9 is provided with boom camera 93.

Telescoping hydraulic cylinder 91 is telescopically operated by telescoping valve 23 that is an electromagnetic proportional switching valve. Telescoping valve 23 can control, to any flow rate, the flow rate of the operation oil that is supplied to telescoping hydraulic cylinder 91. That is, boom 9 is configured to be controllable at any telescoping speed through telescoping hydraulic cylinder 91 telescopically operated by telescoping valve 23. Boom 9 is provided with telescoping sensor 28 that detects the boom length and telescoping speed of boom 9.

Luffing hydraulic cylinder 92 is telescopically operated by luffing valve 24 that is an electromagnetic proportional switching valve. Luffing valve 24 can control, to any flow rate, the flow rate of the operation oil that is supplied to luffing hydraulic cylinder 92. That is, boom 9 is configured to be controllable at any luffing speed through luffing hydraulic cylinder 92 that is telescopically operated by luffing valve 24. Boom 9 is provided with luffing sensor 29 that detects the luffing angle and luffing speed of boom 9.

Boom camera 93 acquires images of load W, ground objects and the like. Boom camera 93 is provided at an end portion of boom 9. In addition, boom camera 93 is configured to be rotatable 360 degrees, and can capture 360 degrees around an end portion of boom 9. Note that boom camera 93 is connected to control apparatus 32 described later.

Main hook block 10 and sub hook block 11 are members for lifting load W. Main hook block 10 is provided with main hook 10*a*. Sub hook block 11 is provided with sub hook 11*a*.

Main winch 13 and main wire rope 14 are mechanisms for lifting load W hooked on main hook 10*a*. In addition, sub winch 15 and sub wire rope 16 are mechanisms for lifting load W hooked on sub hook 11*a*. Main winch 13 and sub winch 15 are provided with winding sensor 26 that detects their respective rotation amounts. Main winch 13 is configured to be operated at given feed-in and feed-out speeds by controlling the main-hydraulic motor by main valve 25*m* that is an electromagnetic proportional switching valve. Likewise, sub winch 15 is configured to be operated at given feed-in and feed-out speeds by controlling the sub-hydraulic motor by sub valve 25*s* that is an electromagnetic proportional switching valve.

Figure 2:
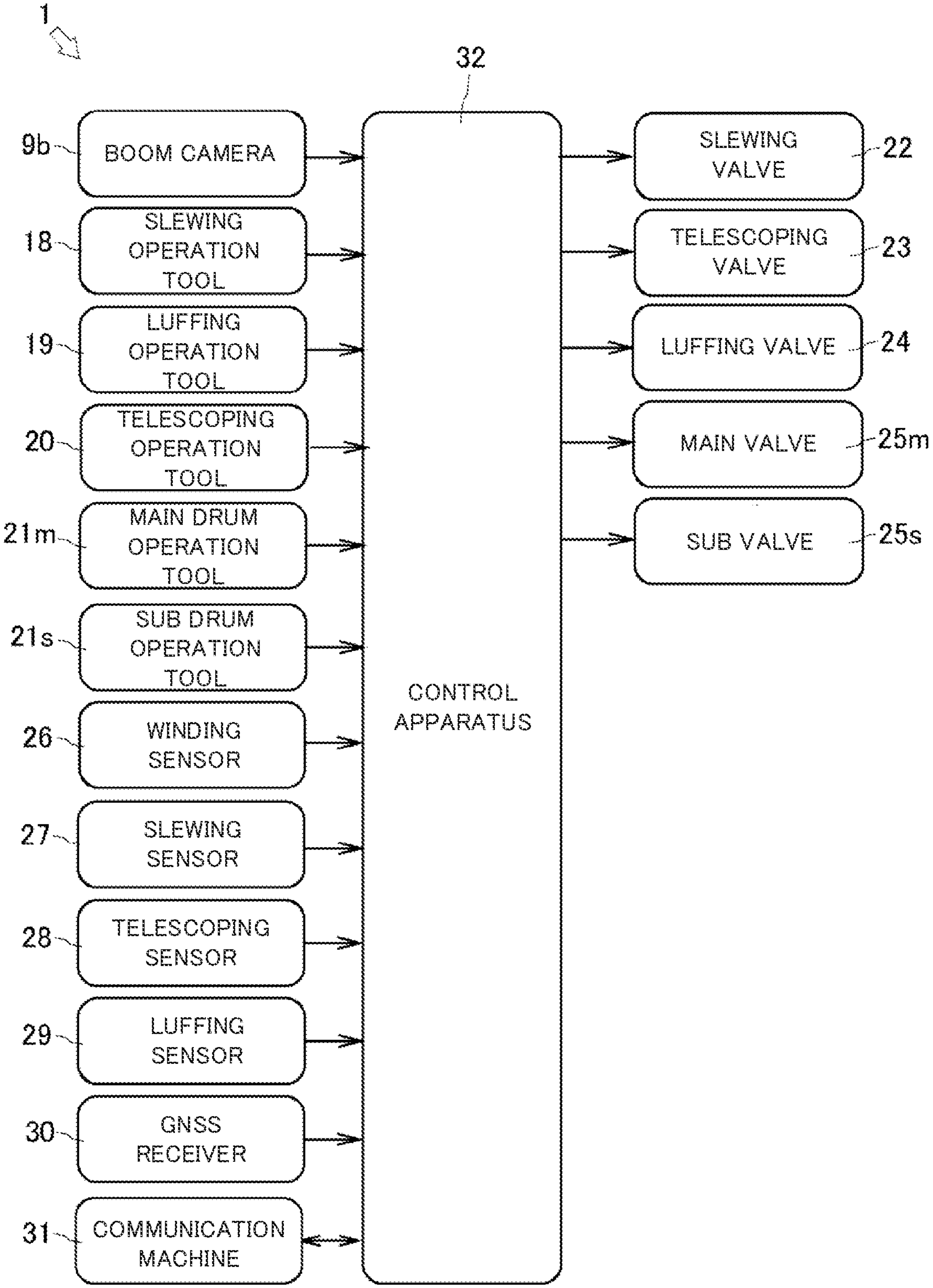
FIG. 2 is a block diagram illustrating a control configuration of an entirety of a crane.
Figure 3:
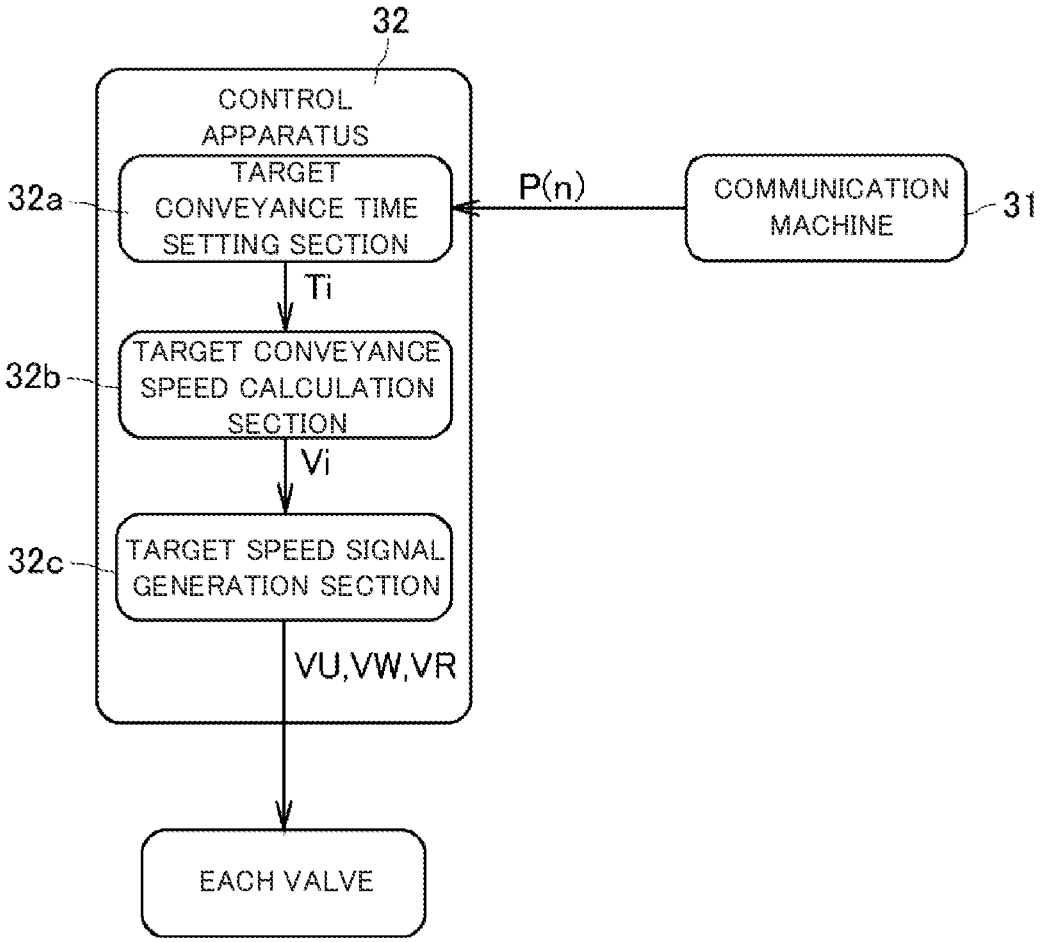
FIG. 3 is a block diagram illustrating a configuration of a control apparatus.

Note that while an exemplary case where load W hooked on sub hook 11*a* is lifted by sub winch 15 and sub wire rope 16 as illustrated in FIG. 1 is mainly described below, the crane control method according to the embodiment of the present invention is also applicable to a case where load W hooked on main hook 10*a* is lifted by main winch 13 and main wire rope 14.

Cabin 17 is a structure that covers the operation seat. An operation tool for operating vehicle 2 and an operation tool for operating crane apparatus 6 are provided in cabin 17. Slewing operation tool 18 can operate slewing hydraulic motor 81. Luffing operation tool 19 can operate luffing hydraulic cylinder 92. Telescoping operation tool 20 can operate telescoping hydraulic cylinder 91. Main drum operation tool 21*m* can operate the main-hydraulic motor. Sub drum operation tool 21*s* can operate the sub-hydraulic motor.

GNSS receiver 30 receives a distance measurement radio wave from a satellite to calculate the latitude, longitude, and altitude. GNSS receiver 30 is provided in cabin 17. Thus, crane 1 can acquire the position coordinates of cabin 17. In addition, it is possible to acquire the orientation with reference to vehicle 2. Note that GNSS receiver 30 is connected to control apparatus 32 described later.

Communication machine 31 is an apparatus that communicates with an external server computer. Communication machine 31 is provided in cabin 17. Communication machine 31 is configured to acquire path information described later and the like from the external server computer. Note that communication machine 31 is connected to control apparatus 32 described later. Note that while a configuration in which path information is acquired from the external server computer is described in the present embodiment, the path information may be stored in a storage apparatus provided in crane 1 such that control apparatus 32 can acquire the path information without going through communication machine 31.

Control apparatus 32 controls each actuator of crane 1 through each operating valve. Control apparatus 32 is provided in cabin 17. Practically, control apparatus 35 may have a configuration in which a CPU, ROM, RAM, HDD and the like are connected through a bus, or a configuration composed of one chip LSI or the like.

Control apparatus 32 is a computer that controls various switching valves (slewing valve 22, telescoping valve 23, luffing valve 24, main valve 25*m* and sub valve 25*s*). Control apparatus 32 stores various programs and data for controlling the various switching valves (22, 23, 24, 25 *m* and 25*s*). In addition, control apparatus 32 is connected to various sensors (winding sensor 26, slewing sensor 27, telescoping sensor 28 and luffing sensor 29). Further, control apparatus 32 is connected to various operation tools (slewing operation tool 18, luffing operation tool 19, telescoping operation tool 20, main drum operation tool 21*m* and sub drum operation tool 21*s*). Thus, control apparatus 32 can generate a control signal corresponding to the amount of operation of the various operation tools (18, 19, 20, 21*m* and 21*s*).

In addition, when performing automatic conveyance by crane 1, control apparatus 32 can generate control signals for controlling the various switching valves (slewing valve 22, telescoping valve 23, luffing valve 24, main valve 25*m* and sub valve 25*s*) on the basis of given path information.

Crane 1 having the above-mentioned configuration can move crane apparatus 6 to any position by running vehicle 2. In addition, crane 1 can increase the lifting height and operational radius of crane apparatus 6 by raising and extending boom 9. Further, crane 1 can move load W by using movements such as the slewing, luffing and telescoping of boom 9, winding up of sub wire rope 16 and the like alone or in combination.

Specific Configuration of Control Apparatus

Control apparatus 32 includes target conveyance time setting section 32*a*, target conveyance speed calculation section 32*b*, and target speed signal generation section 32*c*.

Target conveyance time setting section 32*a* is a part of control apparatus 32, and sets target conveyance time Ti for each section.

Target conveyance speed calculation section 32*b* is a part of control apparatus 32, and calculates target conveyance speed Vi on the basis of calculated target conveyance time Ti of each section and the moving length of load W in each section.

Target speed signal generation section 32*c* is a part of control apparatus 32, and generates target speed signal VU in the luffing direction of boom 9, target speed signal VR in the slewing direction, and target speed signal VW in the feed-in and feed-out direction of the wire rope (main wire rope 14 or sub wire rope 16) in conveyance of load W in each section on the basis of calculated target conveyance speed Vi of each section.

Note that control apparatus 32 can detect the current position of load W by processing an image captured by boom camera 93. Alternatively, in the case where a configuration in which GNSS receiver 30 is attached to a hook (main hook 10*a* or sub hook 11*a*) is adopted, crane 1 can detect, by control apparatus 32, the current position of load W on the basis of a signal received by GNSS receiver 30.

Procedure of Generation of Target Speed Signal

Next, a generation procedure of the target speed signal in the method of controlling crane 1 is described.

Figure 4:
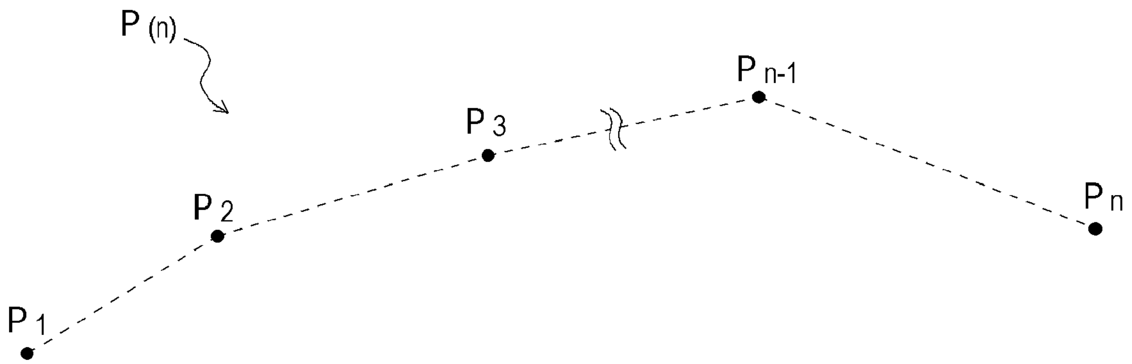
FIG. 4 is a schematic view illustrating point group data given as path information.

Path information of load W given to crane 1 is generated in the form of point group data P(n) (n is a natural number) as illustrated in FIG. 4 by a separately prepared path information generation means. In the present embodiment, the path information generation means is an external server, and point group data P(n) serving as path information is taken into control apparatus 32 of crane 1 through communication machine 31 that communicates with the external server (see FIG. 2).

As illustrated in FIG. 4, point group data P(n) is information composed of n nodes (points), and each node includes information about the coordinates of the passing point of load W. Numbers attached to the nodes indicate the passage order of the nodes. Specifically, node P1 is the coordinate data of the first passing point of load W, and node Pn is the coordinate data of the nth (last) passing point of load W. As the position of load W, for example, the coordinates of the gravity center of load W are used.

When point group data P(n) is given, first, control apparatus 32 sets target conveyance time Ti between each node. Note that in the following description, the region between nodes is referred to as section. For example, control apparatus 32 sets target conveyance time Ti by allocating the required conveyance time (the time required for the conveyance from the start point to the end point) desired by the user in consideration of the conveyance distance in each section and the like. Subscript i of the target conveyance time indicates the order of the section (i is a natural number).

After setting target conveyance time Ti of each section, control apparatus 32 calculates target conveyance speed Vi of each section on the basis of target conveyance time Ti. Target conveyance speed Vi calculated here is a value obtained by dividing the distance between each section by target conveyance time Ti. That is, target conveyance speed Vi corresponds to the average conveyance speed of load W in the section.

After calculating target conveyance speed Vi of each section, control apparatus 32 generates target speed signal VU in the luffing direction of boom 9, target speed signal VR in the slewing direction, and target speed signal VW in the feed-in and feed-out direction of each of wire ropes 14 and 16 in main winch 13 or sub winch 15 on the basis of the target conveyance speed Vi and the crane model. Here, the "target speed signal" is a signal for the request to each actuator for the target speed for displacing boom 9 in the luffing direction and the slewing direction and the target speed for displacing each of wire ropes 14 and 16 in the feed-in and feed-out direction, and includes information representing each target speed.

Calculation of Limiting Coefficient

Figure 5:
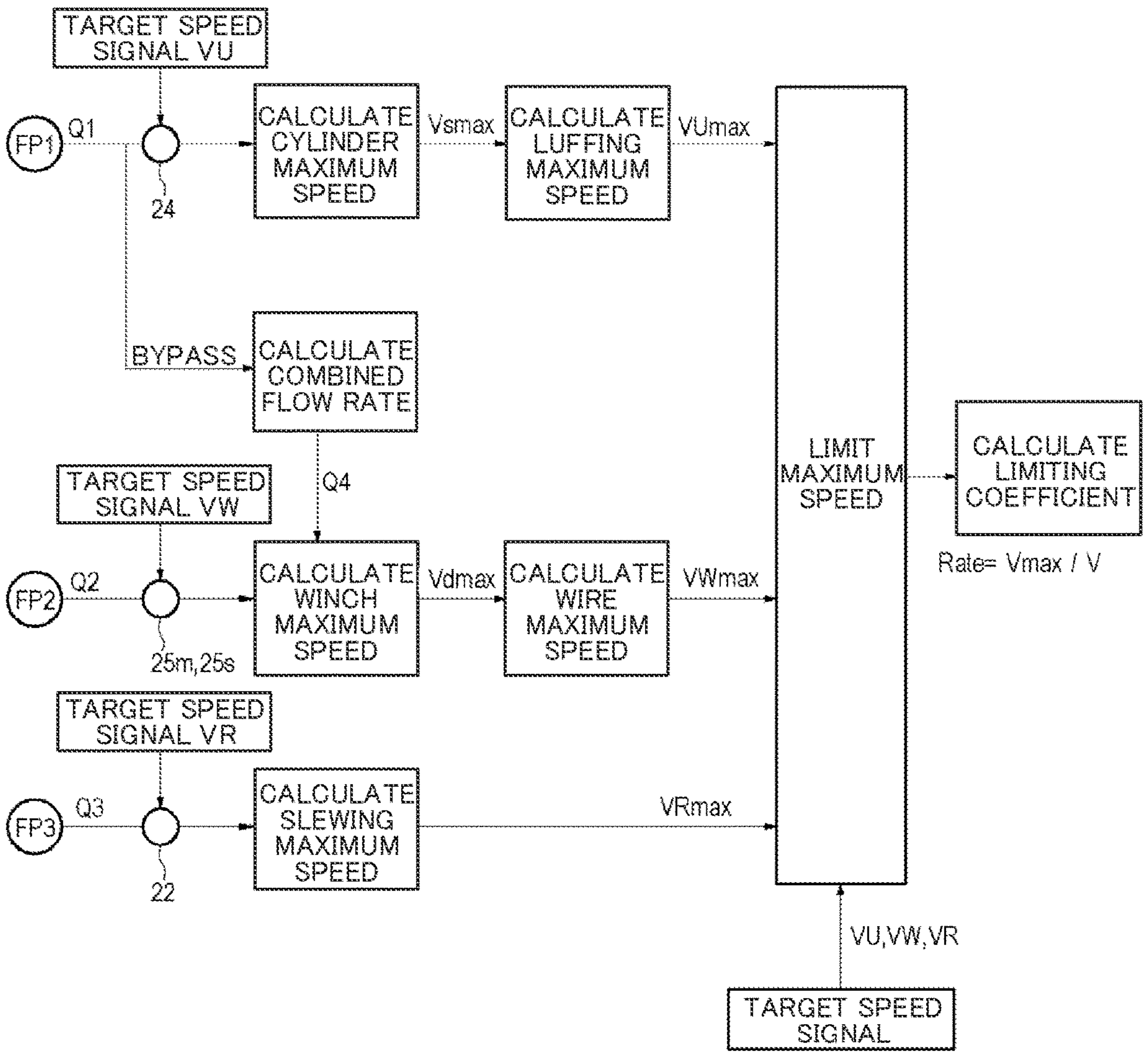
FIG. 5 is a block diagram illustrating a control configuration for limiting a target control signal.

As illustrated in FIG. 5, crane 1 includes first hydraulic pump FP1 that supplies operation oil to luffing hydraulic cylinder 92, second hydraulic pump FP2 that supplies operation oil to main winch 13 or sub winch 15, and third hydraulic pump FP3 that supplies operation oil to slewing hydraulic motor 81. The quantity of discharging oil of first hydraulic pump FP1 is Q1, the quantity of discharging oil of second hydraulic pump FP2 is Q2, and the quantity of discharging oil of third hydraulic pump FP3 is Q3. The quantity of discharging oil of each of hydraulic pumps FP1 to P3 depends on the rotational frequency of the engine (not illustrated).

Calculation of Luffing Maximum Speed

When target speed signal VU is input to luffing valve 24, luffing valve 24 is opened at the opening according to target speed signal VU, and operation oil is supplied to luffing hydraulic cylinder 92. Note that a part (quantity Q4) of the operation oil of the discharging quantity Q1 supplied by first hydraulic pump FP1 is supplied to main winch 13 or sub winch 15 in a bypassing manner. That is, the operation oil of quantity Q1 to Q4 is supplied to luffing hydraulic cylinder 92.

Control apparatus 32 calculates maximum speed Vsmax of luffing hydraulic cylinder 92 under the above-described supply condition of the operation oil. Then, control apparatus 32 calculates luffing maximum speed VUmax of boom 9 on the basis of calculated maximum speed Vsmax of luffing hydraulic cylinder 92.

Calculation of Wire Maximum Speed

When target speed signal VW is input to main valve 25*m* or sub valve 25*s*, main valve 25*m* or sub valve 25*s* is opened at an opening according to target speed signal VW, and the operation oil is supplied to main winch 13 or sub winch 15. Note that the operation oil of discharging oil quantity Q2 supplied by second hydraulic pump FP2 and the operation oil of quantity Q4 from first hydraulic pump FP1 in a bypassing manner are supplied in combination to main winch 13 or sub winch 15. That is, the operation oil of a quantity of Q2+Q4 is supplied to main winch 13 or sub winch 15.

Control apparatus 32 calculates winch maximum speed Vdmax of main winch 13 or sub winch 15 under the above-described supply condition of the operation oil. Then, control apparatus 32 calculates feed-in and feed-out wire maximum speed VWmax of main wire rope 14 or sub wire rope 16 on the basis of calculated winch maximum speed Vdmax of main winch 13 or sub winch 15.

Calculation of Slewing Maximum Speed

When target speed signal VR is input to slewing valve 22, slewing valve 22 is opened at an opening according to target speed signal VR and the operation oil is supplied to slewing hydraulic motor 81. Note that the operation oil of discharging oil quantity Q3 supplied by third hydraulic pump FP3 is supplied to slewing hydraulic motor 81.

Control apparatus 32 calculates slewing maximum speed VRmax of slewing hydraulic motor 81 under the above-described supply condition of the operation oil.

Comparison of Maximum Speed

Control apparatus 32 compares target speed signal VU and luffing maximum speed VUmax of boom 9 calculated in the above-described manner. Here, in the case where target speed signal VU is greater than luffing maximum speed VUmax, practically, boom 9 can only be operated only at luffing maximum speed VUmax smaller than target speed signal VU. That is, in this case, the operation of the luffing operation of boom 9 cannot be achieved as intended by the operator.

In the case where target speed signal VU is greater than luffing maximum speed VUmax, control apparatus 32 calculates limiting coefficient X1. Limiting coefficient X1 is a value greater than 0 and smaller than 1, which is calculated by VUmax/VU.

Comparison of Maximum Speed

In addition, control apparatus 32 compares target speed signal VW and feed-in and feed-out wire maximum speed VWmax of main wire rope 14 or sub wire rope 16 calculated in the above-described manner. Here, in the case where target speed signal VW is greater than wire maximum speed VWmax, practically, feed-in and feed-out operation of main wire rope 14 or sub wire rope 16 can only be performed only at wire maximum speed VWmax smaller than target speed signal VW. That is, in this case, the operation of the feed-in and feed-out operation of main wire rope 14 or sub wire rope 16 cannot be achieved as intended by the operator.

In the case where target speed signal VW is greater than wire maximum speed VWmax, control apparatus 32 calculates limiting coefficient X2. Limiting coefficient X2 is a value greater than 0 and smaller than 1, which is calculated by VWmax/VW.

Comparison of Maximum Speed

Control apparatus 32 compares target speed signal VR and slewing maximum speed VRmax of boom 9 calculated in the above-described manner. Here, in the case where target speed signal VR is greater than slewing maximum speed VRmax, practically, boom 9 can only be slewed only at slewing maximum speed VRmax smaller than target speed signal VR. That is, in this case, the operation of the slewing of boom 9 cannot be achieved as intended by the operator.

In the case where target speed signal VR is greater than slewing maximum speed VRmax, control apparatus 32 calculates limiting coefficient X3. Limiting coefficient X3 is a value greater than 0 and smaller than 1, which is calculated by VRmax/VR.

Limitation of Maximum Speed

Control apparatus 32 limits the target speed signals of all actuators (i.e., luffing hydraulic cylinder 92 and main winch 13 or sub winch 15 and slewing hydraulic motor 81) if any one of limiting coefficients X1 to X3 is calculated. For example, in the case where limiting coefficient X1 is calculated, all target speed signals VU, VW and VR are multiplied by limiting coefficient X1. Note that in the case where a plurality of limiting coefficients is calculated, control apparatus 32 uses the limiting coefficient having the smallest value among the calculated limiting coefficients. Note that the hydraulic circuit illustrated in FIG. 5 is an example, and the control method described in the present embodiment can be applied also to an apparatus including a hydraulic circuit having another configuration (for example, apparatuses other than cranes), and, an intended operation of the apparatus can be achieved by taking into consideration the upper limit of the flow rate in each actuator on a hydraulic circuit.

Effect of Limitation of Maximum Speed

By multiplying all target speed signals VU, VW and VR by the same limiting coefficient, the target speed signal over the practical operative maximum speed can be limited to an operative maximum speed or lower while maintaining the speed balance of each of target speed signals VU, VW and VR.

Figure 6:
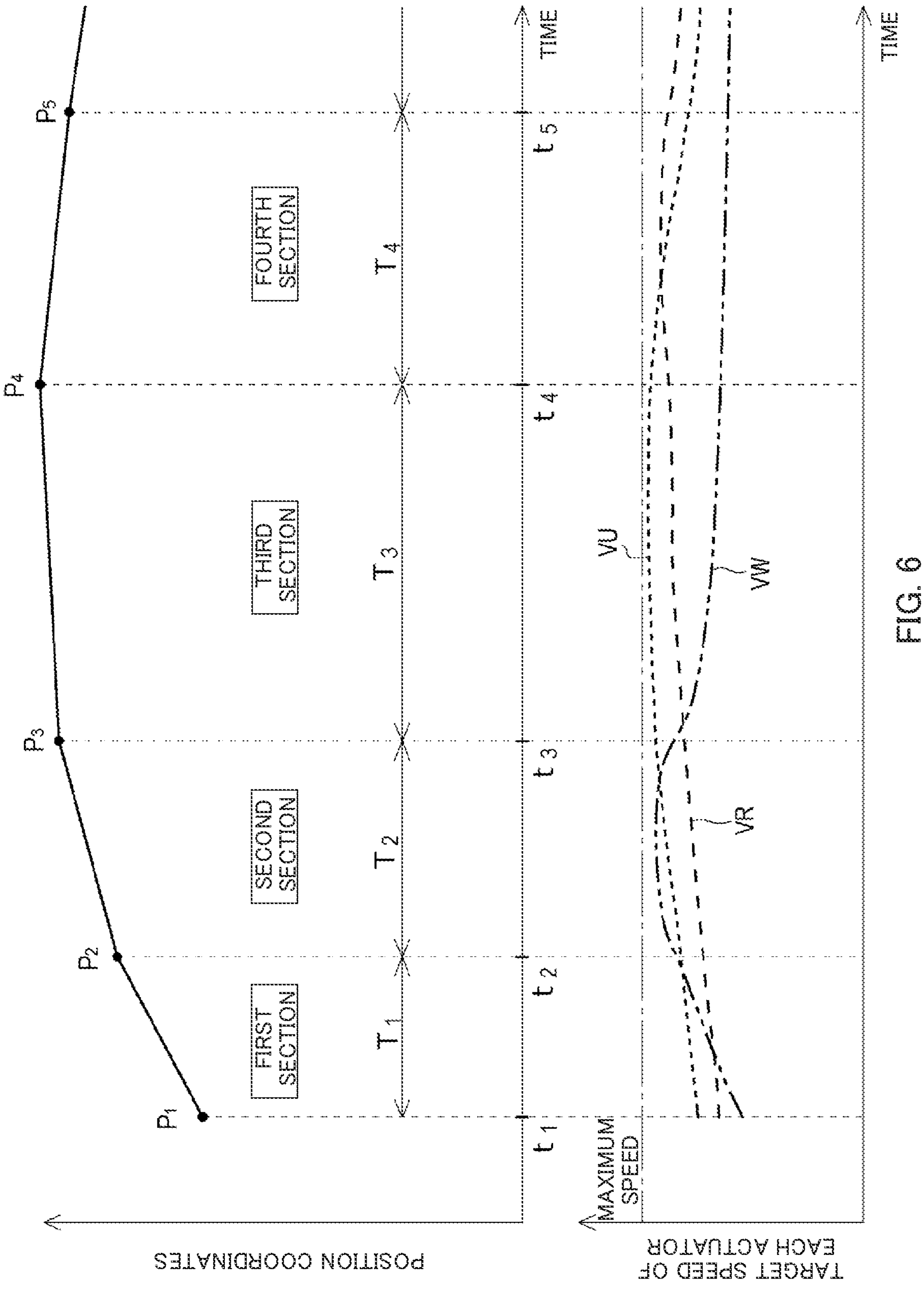
FIG. 6 is a drawing illustrating a relationship between a change in target speed signal and a maximum speed and a setting state of a target conveyance time for each section of a conveyance path in a case where the control method according to the embodiment of the present invention is used.
Figure 7:
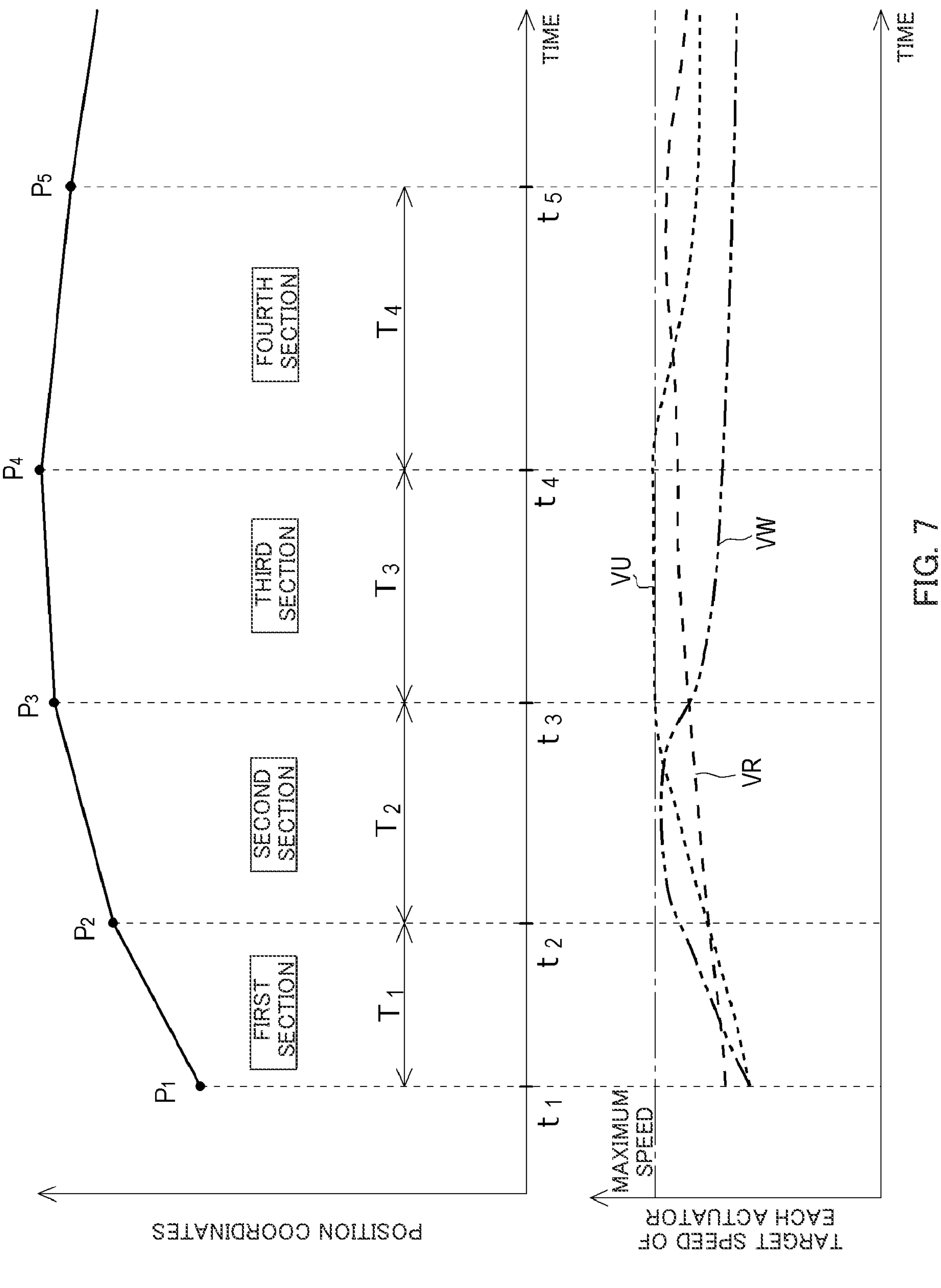
FIG. 7 is a drawing illustrating a relationship between a change in target speed signal and a maximum speed and a setting state of a target conveyance time for each section of a conveyance path in a case where the control method according to the embodiment of the present invention is not used.

FIG. 6 schematically illustrates a relationship between a change in target speed signal and a maximum speed and a setting state of target conveyance time Ti in the case where the target speed signal is limited, and FIG. 7 schematically illustrates a relationship between a change in target speed signal and a maximum speed and a setting state of target conveyance time Ti in the case where the target speed signal is not limited.

As illustrated in FIG. 7, in the case where the target speed signal is not limited, the luffing direction of boom 9 is greater than the maximum speed in or around the third section in the target speeds of the actuators target speed signal VU. In view of this, in the region around the third section, load W cannot be conveyed along the set path. In addition, in this case, sway of load W may occur during automatic conveyance.

On the other hand, as illustrated in FIG. 6, in the case where the target speed signal is limited, the target speed of each actuator (here, target speed signal VU in the luffing direction of boom 9) is prevented from exceeding the maximum speed by extending target conveyance time T3 of the third section. In view of this, also in the region around the third section, load W can be conveyed along the set path and sway of load W during automatic conveyance can be suppressed. Note that in the case where the target speed signal is limited, the total time required for the automatic conveyance from the start point to the end point tends to be extended.

Control Flow of First Embodiment

Next, the method of controlling crane 1 is described with reference to a more detailed control flow. Crane 1 can automatically convey load W in accordance with a control flow according to the first embodiment illustrated in FIG. 8A.

Figure 8A:
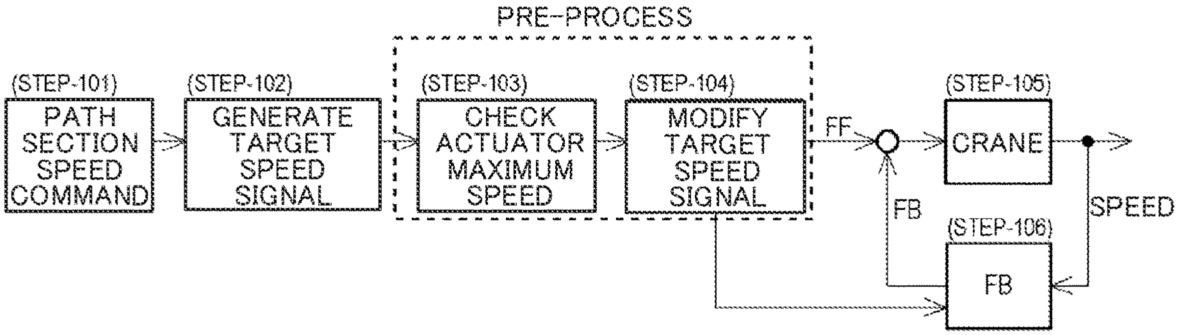
FIGS. 8A and 8B are flowcharts of a control step of a crane of a first embodiment and a second embodiment, respectively.

As illustrated in FIG. 8A, in crane 1, the user provides a speed command (acceleration or deceleration) in a section using an input means (such as a joy stick) (STEP-101). Here, the speed command is target conveyance speed Vi in the section.

Next, on the basis of target conveyance speed Vi, control apparatus 32 generates target speed signal VU in the luffing direction of boom 9, target speed signal VR in the slewing direction, and target speed signal VW in the feed-in and feed-out direction of main wire rope 14 or sub wire rope 16 (STEP-102).

Next, control apparatus 32 checks if each of target speed signals VU, VW and VR is not greater than each of actuator maximum speeds VUmax, VWmax and VRmax by comparing each of target speed signals VU, VW and VR with each of actuator maximum speeds VUmax, VWmax and VRmax (STEP-103).

Next, in the case where any of target speed signals VU, VW and VR is greater than the maximum speed of the actuator, all target speed signals VU, VW and VR are multiplied by a coefficient and modified (STEP-104).

Before executing an automatic conveyance control based on given path information (point group data P(n)), control apparatus 32 executes the following process as a pre-process. On the basis of the given path information (point group data P(n)), control apparatus 32 preliminarily sets target conveyance time Ti for each section, and determines the section where each of target speed signals VU, VW and VR is greater than each of actuator maximum speeds VUmax, VWmax and VRmax by comparing each of target speed signals VU, VW and VR with each of actuator maximum speeds VUmax, VWmax and VRmax in each section. In addition, control apparatus 32 preliminarily calculates coefficients (coefficients X1 to X3) for modifying all target speed signals VU, VW and VR in the section where each of target speed signals VU, VW and VR is greater than each of actuator maximum speeds VUmax, VWmax and VRmax.

Next, control apparatus 32 controls crane 1 on the basis of target speed signals VU, VW and VR after the modification (STEP-105).

Next, after the operation of crane 1, control apparatus 32 detects the operation speed of each actuator actual, determines the difference from the requested speed based on target speed signals VU, VW and VR after the modification, and feeds back the difference to target speed signals VU, VW and VR (STEP-106). In this manner, the difference between the path set based on the path information (point group data P(n)) and the path on which load W has actually moved is reduced.

Control Flow According to Second Embodiment

Figure 8B:
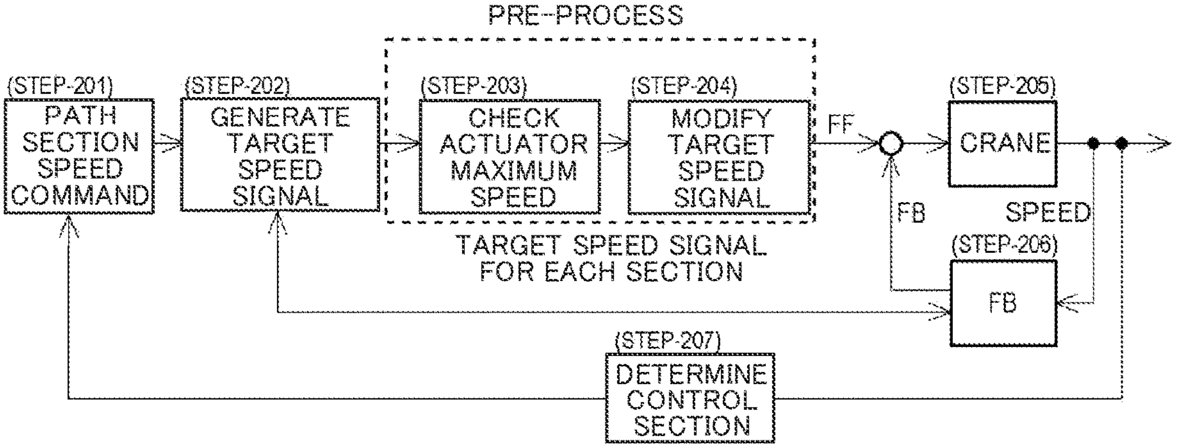

In addition, in the case where crane 1 includes a means (such as boom camera 93 and GNSS receiver 30) that can detect the location information of load W in real time, load W can be automatically conveyed in accordance with the control flow according to the second embodiment illustrated in FIG. 8B, and the robustness of the automatic conveyance control using path information in crane 1 can be improved by using feedback-control using the location information of the lifting cargo.

As illustrated in FIG. 8B, in crane 1, the user provides a speed command (acceleration or deceleration) in the section using input means (such as a joy stick) (STEP-201). Here, the speed command is target conveyance speed Vi in the section.

Next, control apparatus 32 generates target speed signal VU in the luffing direction of boom 9, target speed signal VR in the slewing direction, and target speed signal VW of the feed-in and feed-out of main wire rope 14 or sub wire rope 16 on the basis of input target conveyance speed Vi (STEP-202).

Next, control apparatus 32 checks if each of target speed signals VU, VW and VR is not greater than each of actuator maximum speeds VUmax, VWmax and VRmax by comparing each of target speed signals VU, VW and VR with each of actuator maximum speeds VUmax, VWmax and VRmax (STEP-203).

Next, in the case where any of target speed signals VU, VW and VR is greater than the actuator maximum speed, all target speed signals VU, VW and VR are multiplied by a coefficient and modified (STEP-204).

Control apparatus 32 executes the following process as a pre-process before executing the automatic conveyance control along the set path on the basis of path information (point group data P(n)). On the basis of given path information (point group data P(n)), control apparatus 32 preliminarily sets target conveyance time Ti for each section, and determines the section where each of target speed signals VU, VW and VR is greater than each of actuator maximum speeds VUmax, VWmax and VRmax by comparing each of target speed signals VU, VW and VR with each of actuator maximum speeds VUmax, VWmax and VRmax in each section. In addition, control apparatus 32 preliminarily calculates coefficients (coefficients X1 to X3) for modifying all target speed signals VU, VW and VR in the section where each of target speed signals VU, VW and VR is greater than each of actuator maximum speeds VUmax, VWmax and VRmax.

Next, control apparatus 32 controls crane 1 on the basis of target speed signals VU, VW and VR after the modification (STEP-205).

Next, after the operation of crane 1, control apparatus 32 detects the actual operation speed of each actuator, determines the difference from the speed of each of target speed signals VU, VW and VR calculated at (STEP-202) (i.e., before the modification), and feeds back the difference to target speed signals VU. VW and VR after the modification (STEP-206). In this manner, the difference between the path set based on the given path information (point group data P(n)) and the path on which load W has actually moved is reduced.

Further, after the operation of crane 1, control apparatus 32 detects the actual position of load W and determines the section where load W is currently located from the position of load W (STEP-207). On the basis of this determination, control apparatus 32 determines the section where load W is currently located, and further executes (STEP-201) under the condition in the determined section. In this manner, automatic conveyance can be performed through a control of comparing the path set based on the given path information (point group data P(n)) and the path on which load W has actually moved while eliminating the difference between the paths, and load W can be automatically reliably conveyed along the set path even under the influence of external disturbance.

That is, with the method of controlling crane 1 according to the embodiment of the present invention, load W can be reliably conveyed along the conveyance path when load W is automatically conveyed along a conveyance path set based on given path information (point group data P(n)) using crane 1.

The above-mentioned embodiments are merely representative forms, and can be implemented in various variations to the extent that they do not deviate from the gist of an embodiment. It is of course possible to implement the invention in various forms, and the scope of the invention is indicated by the description of the claims, and further includes all changes within the meaning and scope of the equivalents of the claims.

INDUSTRIAL APPLICABILITY

The present invention is applicable to a crane control method and a crane that can be controlled by the control method.

REFERENCE SIGNS LIST

1 Crane
9 Boom
32 Control apparatus
Ti Target conveyance time
Vi Target conveyance speed
VU Target speed signal (of boom luffing direction)
VW Target speed signal (of feed-in and feed-out directions of wire rope)
VR Target speed signal (of boom slewing direction)
VUmax Luffing maximum speed
VWmax Wire maximum speed
VRmax Slewing maximum speed
W Load
X1 First coefficient
X2 Second coefficient
X3 Third coefficient

The invention claimed is:

1. A control method of a crane configured to automatically convey a load along a conveyance path given as point group data including at least coordinates of a passing point of the load and a passage order of each passing point by controlling a luffing operation of a boom, a slewing operation, and a feed-in operation and a feed-out operation of a wire rope, wherein the control method comprises steps of:

a first step of setting a target conveyance time of the load in a section defined by two passing points adjacent to each other in the passage order on the point group data;

a second step of calculating a target conveyance speed of the load in the section based on a distance between the two passing points and the target conveyance time in the section;

a third step of calculating, from the target conveyance speed, target speeds of a luffing speed of the boom, a slewing speed of the boom, and a feed-in/feed-out speed of the wire rope in the section for achieving the target conveyance speed;

a fourth step of calculating maximum speeds of the luffing speed of the boom, the slewing speed of the boom, and the feed-in/feed-out speed of the wire rope in the section;

a fifth step of comparing the target speeds and the maximum speeds of the luffing speed of the boom, the slewing speed of the boom, and the feed-in/feed-out speed of the wire rope in the section; and a sixth step of limiting, when there is a target speed greater than a corresponding maximum speed in the fifth step, to be smaller than the maximum speeds, the target speeds of the luffing speed of the boom, the slewing speed of the boom, and the feed-in/feed-out speed of the wire rope by multiplying the target speeds of the luffing speed of the boom, the slewing speed of the boom, and the feed-in/feed-out speed of the wire rope by a same coefficient having a value greater than 0 and smaller than 1, and controlling the crane based on the target speeds that are limited, wherein, in the fourth step, the maximum speeds of the luffing speed of the boom, the slewing speed of the boom, and the feed-in/feed-out speed of the wire rope in the section are calculated on a basis of a condition of supplying operation oil in a hydraulic circuit configured to operate a first actuator to luff the boom, a second actuator to slew the boom, and a third actuator to perform feed-in/feed-out of the wire rope, and wherein, in the sixth step, the target speeds and the maximum speeds of the luffing speed of the boom, the slewing speed of the boom, and the feed-in/feed-out speed of the wire rope in the section are compared, a target speed that exceeds a corresponding maximum speed out of those is extracted, and the coefficient is calculated by dividing the corresponding maximum speed by a corresponding target speed.

2. The control method of the crane according to claim 1, wherein, in the fifth step when there is a plurality target speeds that is greater than the corresponding maximum speed, a smallest value among values calculated by dividing the maximum speed by the target speed is set as the coefficient.

3. The control method of the crane according to claim 1, wherein, in the sixth step, for the luffing speed of the boom, the slewing speed of the boom, and the feed-in/feed-out speed of the wire rope, the target speed that is limited is calculated before automatic conveyance of the load is started.

4. The control method of the crane according to claim 1, wherein, in the sixth step, for the luffing speed of the boom, the slewing speed of the boom, and the feed-in/feed-out speed of the wire rope, the target speeds that are limited are calculated for each section.

5. The control method of the crane according to claim 4, wherein the control method further comprises:

a seventh step of detecting a current position of the load after the crane is operated through a feed forward control using the target speeds of the luffing speed of the boom, the slewing speed of the boom, and the feed-in/feed-out speed of the wire rope; and an eighth step of determining the section where the load is currently located from the current position of the load that is detected, and feedback-controlling the target conveyance speed of the load using the section where the load is currently located that is determined.

6. The control method of the crane according to claim 1, wherein the operation oil of the hydraulic circuit is shared by at least two of the first actuator, the second actuator, and the third actuator.

* * * * *